United States Patent
Carlson et al.

(10) Patent No.: US 11,198,348 B2
(45) Date of Patent: Dec. 14, 2021

(54) LIQUID-DIVERTING PRESSURE RELIEF ASSEMBLY

(71) Applicant: Illinois Tool Works Inc., Glenview, IL (US)

(72) Inventors: Daniel David Carlson, Fenton, MI (US); Gregory Scott Mamelson, Saint John, IN (US); Jason Ray Pranger, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 46 days.

(21) Appl. No.: 16/061,980

(22) PCT Filed: Dec. 14, 2016

(86) PCT No.: PCT/US2016/066535
§ 371 (c)(1),
(2) Date: Jun. 13, 2018

(87) PCT Pub. No.: WO2017/123372
PCT Pub. Date: Jul. 20, 2017

(65) Prior Publication Data
US 2018/0361827 A1    Dec. 20, 2018

Related U.S. Application Data

(60) Provisional application No. 62/277,677, filed on Jan. 12, 2016.

(51) Int. Cl.
*B60H 1/24* (2006.01)
*F16K 15/14* (2006.01)
*F16K 27/02* (2006.01)

(52) U.S. Cl.
CPC .......... *B60H 1/249* (2013.01); *F16K 15/144* (2013.01); *F16K 27/0209* (2013.01)

(58) Field of Classification Search
CPC .......... B60H 1/248; B60H 1/249; B60H 1/26; F16K 17/003; F16K 17/0413;
(Continued)

(56) References Cited

U.S. PATENT DOCUMENTS 2,579,395 A * 12/1951 Raymond ........... F24F 13/1406
454/349
2,770,833 A * 11/1956 Drechsel ............... F16K 1/2007
16/255

(Continued)

FOREIGN PATENT DOCUMENTS

| CN | 203793076 U | 8/2014 |
| CN | 203937483 U | 11/2014 |

(Continued)

OTHER PUBLICATIONS

"Machine Translation of JP07246831." 2020.*
(Continued)

*Primary Examiner* — Vivek K Shirsat
(74) *Attorney, Agent, or Firm* — Quarles & Brady LLP

(57) ABSTRACT

A pressure relief assembly includes a housing defining an air passage chamber having at least one opening, and a flap secured within the air passage chamber. The flap is configured to move into an open position to expose the opening(s) to relieve air pressure. At least one liquid diverter extends from the housing. The liquid diverter(s) is configured to direct moisture away from the flap.

17 Claims, 3 Drawing Sheets

(58) Field of Classification Search
CPC .............. F16K 15/035; F16K 15/144; Y10T 137/7891; F24F 2221/52
USPC ......... 454/162, 70, 164, 128, 131, 147, 367, 454/359
See application file for complete search history.

(56) References Cited

U.S. PATENT DOCUMENTS

| | | | |
|---|---|---|---|
| 3,171,343 A * | 3/1965 | Wexler | F24F 7/00 454/359 |
| 3,250,206 A * | 5/1966 | Strouth | F24F 13/1406 454/359 |
| 4,144,803 A * | 3/1979 | Gotz | B60H 1/248 454/162 |
| 4,667,578 A | 5/1987 | Hagenah | |
| 4,781,106 A * | 11/1988 | Frien | B60H 1/249 137/512.1 |
| 4,899,647 A * | 2/1990 | Garries | E06B 7/02 454/277 |
| 5,105,731 A * | 4/1992 | Kraus | B60H 1/249 454/143 |
| 5,105,849 A | 4/1992 | Clough | |
| 5,492,505 A * | 2/1996 | Bell | B60H 1/249 137/855 |
| 5,591,080 A * | 1/1997 | Ward | F24F 7/02 454/359 |
| 5,601,117 A * | 2/1997 | Lewis | B60H 1/249 137/527.8 |
| 6,210,266 B1 * | 4/2001 | Barton | B29C 45/1676 137/855 |
| 6,468,054 B1 * | 10/2002 | Anthony | F04D 25/12 417/360 |
| 7,077,742 B2 | 7/2006 | Stevenson et al. | |
| 7,204,472 B2 * | 4/2007 | Jones | F16K 15/031 251/129.06 |
| 7,503,843 B1 | 3/2009 | Wilmoth | |
| 8,328,609 B2 | 12/2012 | Schneider | |
| 8,360,104 B2 | 1/2013 | Shereyk | |
| 8,672,734 B2 * | 3/2014 | Labrecque | F24F 7/013 454/353 |
| 8,986,086 B2 * | 3/2015 | Carlson | B60H 1/249 454/162 |
| 9,321,326 B2 * | 4/2016 | Carlson | B60H 1/26 |
| 9,440,511 B2 * | 9/2016 | Hofmann | B60H 1/248 |
| 9,849,754 B2 * | 12/2017 | Kim | B60H 1/249 |
| 2005/0003755 A1 * | 1/2005 | Koessler | F24F 13/18 454/359 |
| 2008/0268763 A1 | 10/2008 | Dippel | |
| 2009/0068940 A1 | 3/2009 | Bloemeling et al. | |
| 2011/0097990 A1 * | 4/2011 | Charron | F24F 13/14 454/367 |
| 2012/0329376 A1 | 12/2012 | Liu et al. | |
| 2014/0242897 A1 | 8/2014 | Rizzo | |
| 2014/0287675 A1 * | 9/2014 | Labrecque | F04D 25/14 454/353 |
| 2016/0152114 A1 * | 6/2016 | Yamamoto | F16K 47/02 454/162 |
| 2016/0222650 A1 | 8/2016 | Kawai et al. | |
| 2018/0215236 A1 | 8/2018 | Carlson | |
| 2019/0032938 A1 * | 1/2019 | Wilding | H05K 7/20709 |
| 2019/0186345 A1 | 6/2019 | Joyce et al. | |
| 2019/0270362 A1 | 9/2019 | Barnes et al. | |
| 2020/0189359 A1 | 6/2020 | Barnes et al. | |

FOREIGN PATENT DOCUMENTS

| | | | |
|---|---|---|---|
| CN | 105082939 A | 11/2015 | |
| CN | 105966200 A * | 9/2016 | |
| DE | 3240291 A1 * | 5/1984 | B60J 5/101 |
| DE | 4322213 | 6/1994 | |
| DE | 19548551 A1 * | 6/1997 | B60H 1/249 |
| DE | 102006056868 A1 | 6/2008 | |
| DE | 102008052303 A1 | 4/2010 | |
| DE | 102013019520 A1 * | 5/2015 | F24F 13/08 |
| DE | 102015101229 A1 * | 7/2016 | B60H 1/249 |
| EP | 2050600 A2 | 4/2009 | |
| FR | 2931396 A1 * | 11/2009 | B60H 1/249 |
| JP | 07246831 A * | 9/1995 | |
| JP | H07 246831 | 9/1995 | |
| JP | 2003246214 A * | 9/2003 | |
| JP | 3647557 B2 * | 5/2005 | |
| JP | 2008126965 A * | 6/2008 | |
| KR | 20040025306 A * | 3/2004 | |
| WO | 2009070487 A1 | 6/2009 | |
| WO | 2014175131 A1 | 10/2014 | |
| WO | 2017079133 A1 | 5/2017 | |
| WO | 2017155637 A1 | 9/2017 | |

OTHER PUBLICATIONS

"Machine Translation for FR2931396A1". 2021.*
"Machine Translation for CN105966200A". 2021.*
"Machine Translation for JP2003246214A". 2021.*
"Machine Translation for JP2008126965A". 2021.*
"Machine Translation of DE19548551A1". 2021.*
"Machine Translation for DE3240291A1". 2021.*
"Machine Translation for DE102013019520A1". 2021.*
"Machine Translation for JP3647557B2". 2021.*
"Machine Translation for DE102015101229A1". 2021.*
"Machine Translation for KR20040025306A". 2021.*
International Search Report and Written Opinion for PCT/US2016/066535.
International Search Report and Written Opinion for PCT/US2017/055083 dated Jan. 18, 2018 (14 pages).
Office Action for corresponding German Patent Application No. 10 2019 133 801.8 dated Jun. 29, 2020. (5 pages).
First Office Action from corresponding Chinese Patent Application No. 201680078203.X, dated Apr. 2, 2021 (16 pages) (English translation included).

* cited by examiner

LIQUID-DIVERTING PRESSURE RELIEF ASSEMBLY

RELATED APPLICATIONS

This application is a National Phase of International Application No. PCT/US2016/066535, filed Dec. 14, 2016, which relates to and claims priority benefits from U.S. Provisional Patent Application No. 62/277,677 entitled "Pressure Relief Assembly Having a Liquid Diverter," filed Jan. 12, 2016, which is hereby incorporated by reference in its entirety.

FIELD OF EMBODIMENTS OF THE DISCLOSURE

Embodiments of the present disclosure generally relate to a venting or pressure relief device configured for use in an enclosed area, such as an automobile, and more particularly to systems and methods of diverting liquid away from a membrane flap(s) of a pressure relief assembly.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

It has been found, however, that water may flow over the top of an installed pressure relief valve. In particular, water may cling to the face of the pressure relief valve, and seep around and/or behind the membrane flaps(s). Accordingly, water may infiltrate the vehicle as it seeps around and/or behind the membrane flap(s).

SUMMARY OF EMBODIMENTS OF THE DISCLOSURE

A need exists for a pressure relief device that prevents water from clinging to membrane flaps. A need exists for a pressure relief device that prevents, minimizes, or otherwise reduces a possibility of water infiltrating into a vehicle.

With those needs in mind, certain embodiments of the present disclosure provide a pressure relief assembly that includes a housing defining an air passage chamber having at least one opening. A flap is secured within the air passage chamber. The flap is configured to move into an open position to expose the opening(s) to relieve air pressure. At least one liquid diverter extends from the housing. The liquid diverter(s) is configured to direct moisture away from the flap.

The air passage chamber may be defined by lateral walls connected to a top wall, a bottom wall, and an air passage wall. The flap may be secured over the air passage wall.

In at least one embodiment, the liquid diverter(s) extends outwardly from the top wall above the flap. The liquid diverter(s) may be downwardly canted. For example, the liquid diverter(s) may be downwardly canted at a first angle with respect to an interior surface of a top wall of the pressure relief assembly. The flap in an at-rest position may be oriented at a second angle with respect to the interior surface of the top wall. The first angle is greater than the second angle. In at least one embodiment, the first angle is greater than 90 degrees and less than 180 degrees.

The liquid diverter(s) may be integrally formed and molded with the housing.

The pressure relief assembly may also include an upstanding outer rim that is configured to divert moisture around the air passage chamber.

The pressure relief assembly may include a first liquid diverter and a second liquid diverter. The first liquid diverter may be positioned above and spaced apart from the second liquid diverter. The first liquid diverter may be parallel with the second liquid diverter.

In at least one embodiment, the liquid diverter(s) includes an expanded main portion that connects to the housing through a recessed root.

Figure 1:
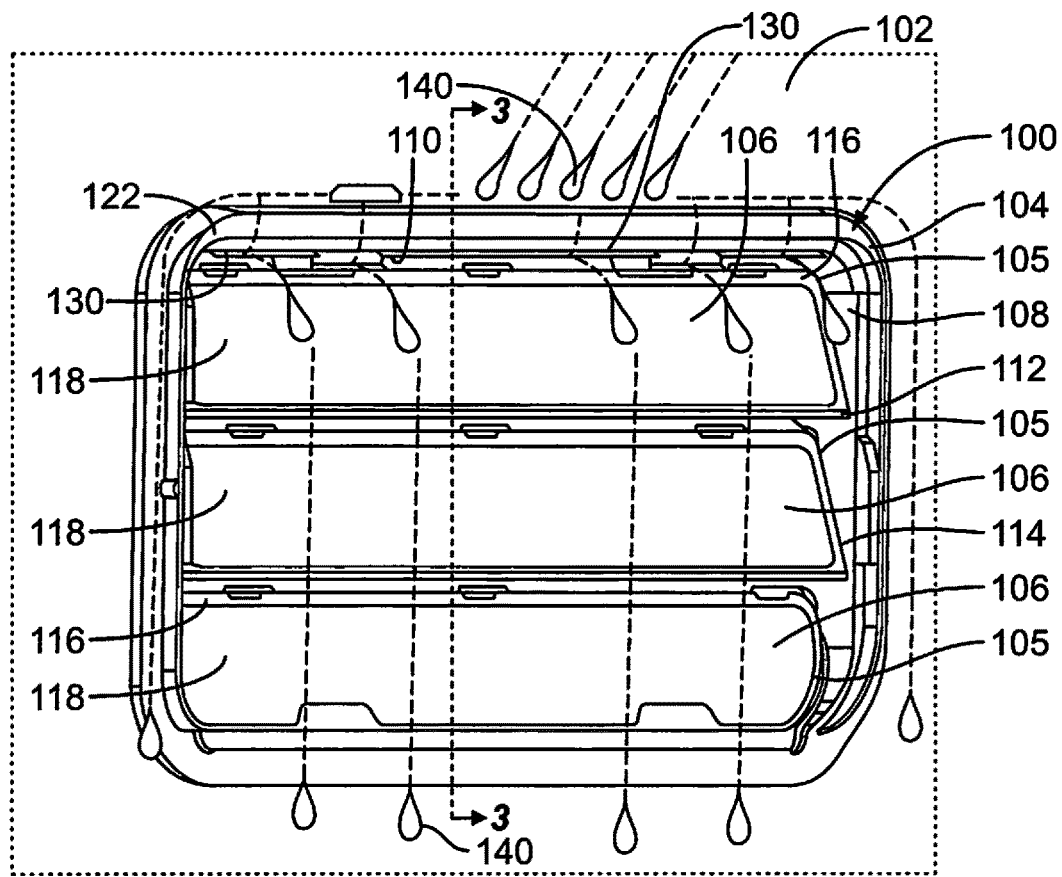
FIG. 1 illustrates a front perspective view of a pressure relief assembly secured to a panel, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pressure relief assembly having at least one liquid diverter, such as a drip edge, that diverts or otherwise re-directs moisture (such as rain or car wash water) away from membrane flaps, and reduces the possibility that the water enters a vehicle. The liquid diverter(s) resists liquid ingress into and through the pressure relief assembly.

In at least one embodiment, the liquid diverter is a canted member, such as a beam, flap, post, ledge, stud, lip, or the like that is positioned on a housing or frame. The liquid diverter extends outwardly away from the membrane flap(s). The liquid diverter may be integrally formed and molded with the housing or frame of the pressure relief assembly. In at least one embodiment, the liquid diverter may be bent to an appropriate orientation after molding. In at least one other embodiment, the liquid diverter may be folded over after the molding process.

In at least one embodiment, a root of the liquid diverter may include a thinned, recessed, or otherwise reduced area. The reduced root allows the liquid diverter to be efficiently bent to a desired liquid-diverting angle.

Examples of pressure relief assemblies are shown and described in U.S. Pat. No. 8,360,104, entitled "Pressure Relief Assembly," which is hereby incorporated by reference in its entirety.

FIG. 1 illustrates a front perspective view of a pressure relief assembly 100 secured to a panel 102, according to an embodiment of the present disclosure. The panel 102 may be a panel of sheet metal of a vehicle, for example. The pressure relief assembly 100 secures into an opening formed through the panel 102. For example, the pressure relief assembly 100 snapably secures into the opening formed through the panel 102.

The pressure relief assembly 100 includes a frame or housing 104 that includes a plurality of air passage chambers 105 having flaps 106 over openings (hidden from view in FIG. 1). The pressure relief assembly 100 may include more or less air passage chambers 105 and flaps 106 than shown. Each air passage chamber 105 includes lateral walls 108 integrally connected to top and bottom walls 110 and 112, respectively. An air passage wall 114 extends between the lateral, top and bottom walls 108, 110, and 112, respectively. The air passage wall 114 includes one or more openings (hidden from view in FIG. 1) that are configured to allow air to pass therethrough. The air passage wall 114 angles upwardly from the top wall 110 to the bottom wall 112. The angle of the air passage wall 114 may vary based on a desired amount of flap resistive force.

The housing 104 may be formed of a plastic, such as acrylic. In at least one embodiment, the housing 104 is formed of injection-molded polypropylene. The housing 104 may be formed through a thermoforming process, which is generally an efficient and economical way of making various plastic devices. During the manufacturing process, a roll of plastic may be fed into a cavity, and then the plastic is formed using heat and pressure.

Instead of a plurality of air passage chambers 105, the housing 104 may include a single air passage chamber 105.

Also, optionally, the air passage wall 114 may be coplanar with a flat underside of the housing 104, instead of being angled.

The flaps 106 cover the air passage walls 114. Each flap 106 is anchored to the housing 104 proximate to the top wall 110. For example, each flap 106 may include a bracket 116 (which may include a connecting post) that mounts to the frame 104 proximate to a top wall 110. The bracket 116 is coupled to a flap membrane 118 that is positioned over the air passage wall 114. The membranes 118 may be formed of a flexible thermoplastic elastomer, such as ethylene propylene diene monomer (EPDM) rubber, polypropylene, Hytrel, Lexan, Tyvac or Mylar, for example.

In an at rest position, the membranes 118 cover the openings formed through the air passage walls 114. As air pressure builds and is exerted into an underside of the membranes 118, the membranes 118 flap open about the brackets 116 so that the openings are exposed, thereby allowing air to vent through the pressure relief assembly 100.

Figure 2:
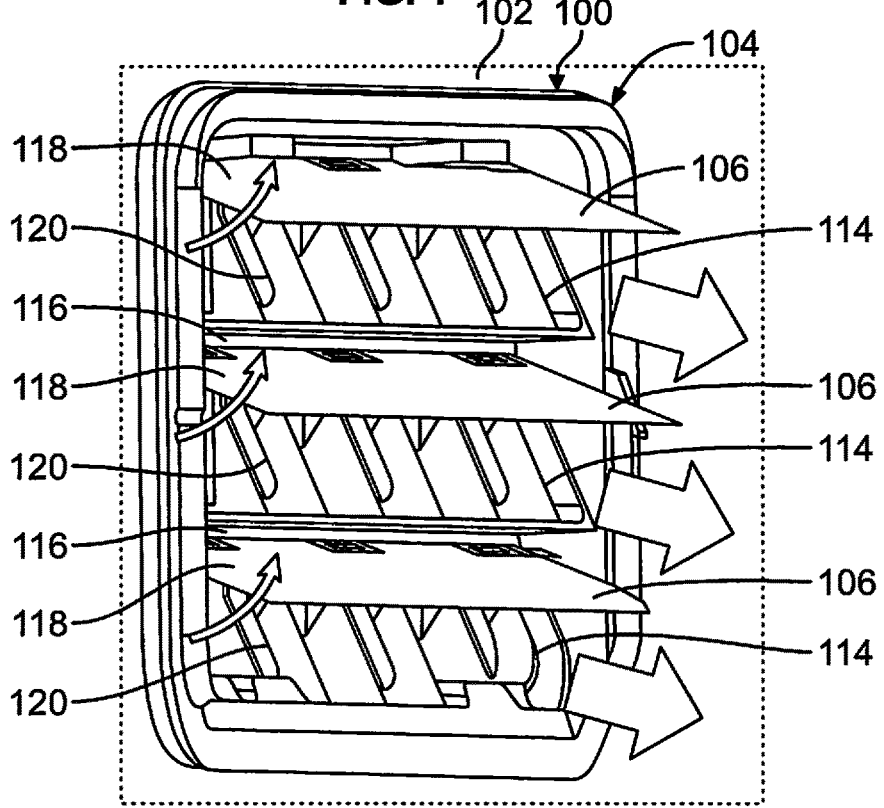
FIG. 2 illustrates a front perspective view of a pressure relief assembly having opened flaps, according to an embodiment of the present disclosure.

FIG. 2 illustrates a front perspective view of the pressure relief assembly 100 having opened flaps 106. Air pressure of a predetermined magnitude that is exerted into the undersides of the membranes 118 forces the membranes 118 to flap open about the brackets 116, thereby exposing the openings 120 formed through the air passage walls 114. The exposed openings 120 allow air to escape through the pressure relief assembly 100, thereby relieving air pressure from within a vehicle.

Referring again to FIG. 1, the housing 104 may also include an upstanding outer rim 122 that surrounds at least a portion of the air passage chambers 105. The upstanding outer rim 122 routes moisture around the housing 104. In particular, the outer rim 122 diverts moisture around the air passage chambers 105.

A liquid diverter 130 outwardly extends from the housing 104. The liquid diverter 130 may be within an air passage chamber 105 and may extend from the top wall 110 above the flap 106. Each air passage chamber 105 may include a liquid diverter 130. In at least one other embodiment, only an uppermost air passage chamber 105 may include a liquid diverter 130. In at least one embodiment, an air passage chamber 105 may include multiple liquid diverters 130.

The liquid diverter 130 may outwardly extend from the housing 104 within the air passage chamber 105 at an angle that is configured to direct water away from the flaps 106. The liquid diverter 130 may extend along an entire length of the flap 106. In at least one embodiment, the liquid diverter 130 extends along a length that is greater than that of the flap 106. Alternatively, the liquid diverter 130 extends along a length that is less than that of the flap 106.

The liquid diverter 130 provides a drip edge that diverts or otherwise re-directs water 140 away from flaps 106, and reduces the possibility that the water 140 enters the vehicle. The liquid diverter 130 resists liquid ingress into and through the pressure relief assembly 100.

The liquid diverter 130 may be an outwardly canted member, such as a beam, flap, post, ledge, stud, rim, lip, or the like that extends from the housing 104 within the air passage chamber 105. The liquid diverter extends outwardly away from the flaps 106. The liquid diverter 130 may be integrally formed and molded with the housing 104.

Figure 3:
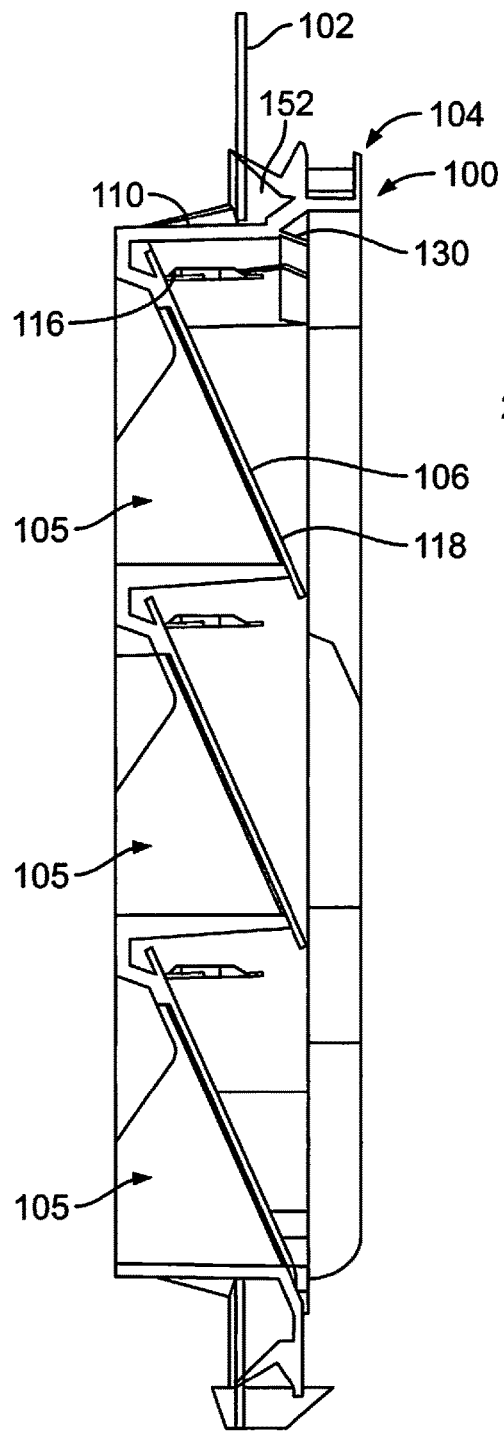
FIG. 3 illustrates a lateral cross-sectional view of a pressure relief assembly secured to a panel through line 3-3 of FIG. 1, according to an embodiment of the present disclosure.

FIG. 3 illustrates a lateral cross-sectional view of the pressure relief assembly 100 secured to the panel 102 through line 3-3 of FIG. 1, according to an embodiment of the present disclosure. As shown, a perimeter seal 152 may be disposed between an edge (such as an exterior edge) of the panel 102 and the housing 104.

Figure 4:
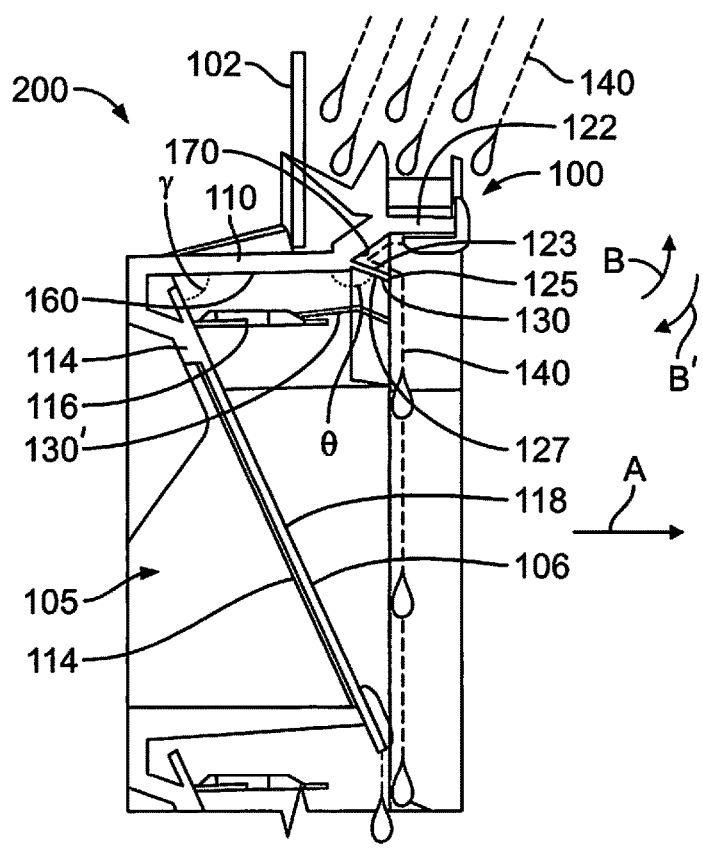
FIG. 4 illustrates a lateral cross-sectional view of an air passage chamber within a pressure relief assembly, according to an embodiment of the present disclosure.

FIG. 4 illustrates a lateral cross-sectional view of an air passage chamber 105 within the pressure relief assembly 100, according to an embodiment of the present disclosure. A liquid diverter 130 may outwardly and downwardly cant from the top wall 110 at an angle θ, which is greater than 90 degrees with respect to an interior surface 160 of the top wall 110. The angle θ may be between 90 degrees and 180 degrees, in order to divert water 140 away from the flaps 106. For example, a liquid diverter 130 formed at an angle θ of between 120 degrees and 160 degrees effectively diverts the water 140 away from the flaps 106. Alternatively, the angle θ may be less than 120 degrees, or greater than 160 degrees.

As shown, the angle θ may be greater than an angle γ between the membrane 118 at an at-rest position (in which the membrane 118 seats on the air passage wall 114) and the interior surface 160 of the top wall 110. The greater angle θ as compared to the angle γ ensures that the liquid diverter 130 directs the water 140 outwardly away from the flap 106.

An interior channel 170 may be formed between the uppermost liquid diverter 130 and the outer rim 122. The water 140 may cling to an interior surface of the outer rim 122 and pass into the interior channel 170. Gravity forces the water 140 downwardly into the interior channel 170 and toward and onto the outer surface 123 of the liquid diverter 130. The outward and downward cant of the liquid diverter 130 shunts or otherwise redirects the water 140 off the tip 125 of the liquid diverter 130 and away from the flap 106. The cant of the liquid diverter 130 causes the water 140 to downwardly drip off the tip 125, instead of clinging to an interior surface 127 of the liquid diverter 130. The diverted water passes over an outer surface of the panel 102, instead of infiltrating into an interior space 200.

An additional liquid diverter 130' may be positioned underneath the liquid diverter 130. The liquid diverter 130' provides an additional safeguard against water infiltration in the event that water 140 is not fully diverted by the liquid diverter 130. The liquid diverter 130' may include the same or similar cant as the liquid diverter 130. The liquid diverter 130' may extend from the air passage wall 114, and/or the bracket 116, which may be or include a securing post that secures the membrane 118 to the air passage wall 114. The liquid diverters 130 and 130' may be parallel with one another. Alternatively, the cant of the liquid diverters 130 and 130' may differ. The liquid diverters 130 and 130' may be the same length, width, and thickness. Alternatively, the liquid diverters 130 and 130' may differ in length, width, and/or thickness. Alternatively, the pressure relief assembly 100 may not include the liquid diverter 130'. As another alternative, the pressure relief assembly 100 may include the liquid diverter 130', but not the liquid diverter 130.

Figure 5:
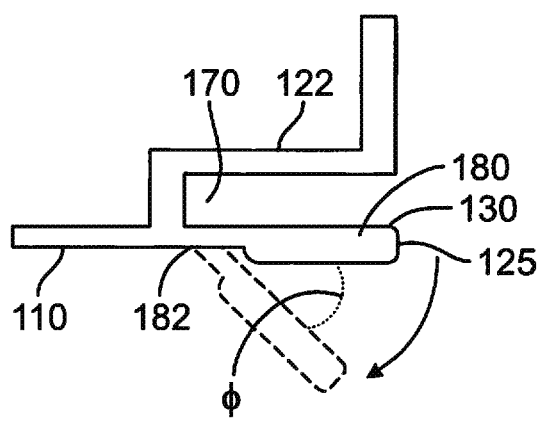
FIG. 5 illustrates a lateral view of a liquid diverter, according to an embodiment of the present disclosure.

FIG. 5 illustrates a lateral view of the liquid diverter 130 (or 130'), according to an embodiment of the present disclosure. The liquid diverter 130 may include an expanded main portion 180 that is coupled to the top wall 110 through a recessed root 182. The recessed root 182 may be a thinned portion that has a thickness that is less than that of the expanded main portion 180. The recessed root 182 allows for the liquid diverter 130 to be efficiently formed at an angle φ. For example, a tool may be used to bend the liquid diverter 130 to the angle φ about the recessed root 182. Because the recessed root 182 is thinned, the bending process is easier. Alternatively, the liquid diverter 130 may not include a recessed root 182.

Referring again to FIG. 4, in at least one other embodiment, the liquid diverters 130 and 130' may be integrally formed and molded as shown. A molding tool may be used to form the pressure relief assembly 100, including the liquid diverters 130 and 130'. As the molding tool separates from the pressure relief assembly 100 in the direction of arrow A, the liquid diverters 130 and 130' may fold upward in the direction of arc B. After the molding tool is removed, however, the liquid diverters 130 may pivot back down in the direction of arc B' to the positions shown in FIG. 4. In at least one embodiment, a separate and distinct tool may be used to pivot or fold the liquid diverters 130 and 130' to the positions shown in FIG. 4.

In at least one embodiment, the liquid diverters 130 and 130' may be formed and molded so that the interior surfaces 127 are parallel with the interior surface 160 of the top wall 110. A tool may then be used to pivot or fold the liquid diverters 130 and 130' into the positions shown in FIG. 4.

Figure 6:
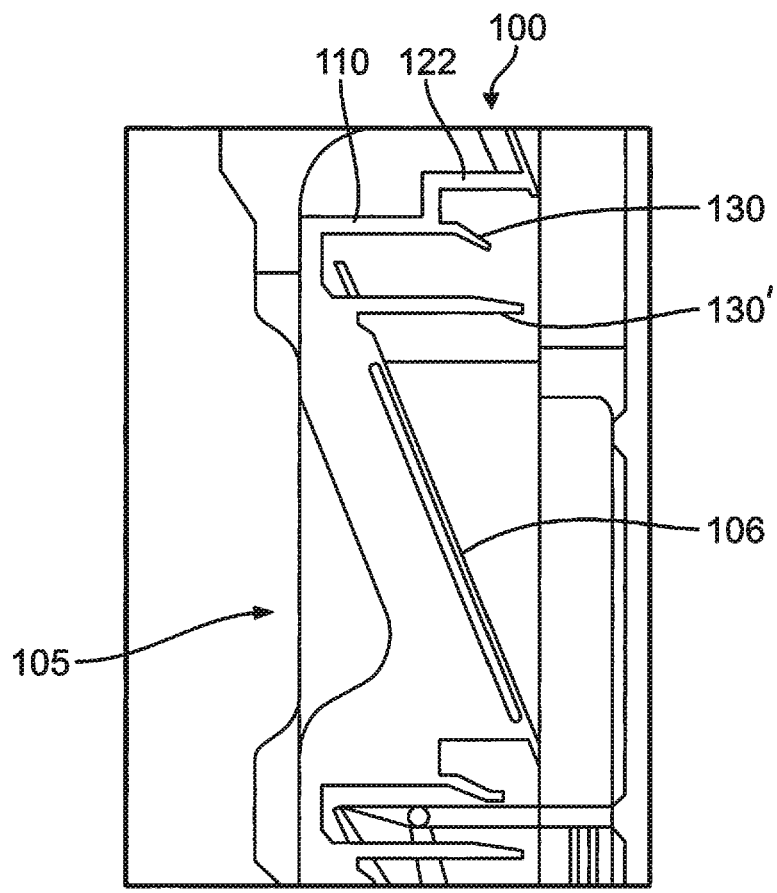
FIG. 6 illustrates a lateral cross-sectional view of an air passage chamber within a pressure relief assembly, according to an embodiment of the present disclosure.

FIG. 6 illustrates a lateral cross-sectional view of an air passage chamber 105 within the pressure relief assembly 100, according to an embodiment of the present disclosure. As shown, the liquid diverter 130 outwardly extends from the top wall 110, and downwardly cants. A liquid diverter 130' (which may be part of a flap retention post) may outwardly extend below the liquid diverter 130, and may be parallel with the top wall 110 (instead of being downwardly canted). The liquid diverter 130' may be downwardly canted after formation. For example, the straight orientation of the liquid diverter 130' shown in FIG. 6 allows for easier removal of a molding tool from the pressure relief assembly 100. After the molding tool 130' is removed from the pressure relief assembly 100, the liquid diverter 130' is folded down to a position that is parallel with the liquid diverter 130.

As described above, embodiments of the present disclosure provide pressure relief devices that prevent, minimize, or otherwise reduce water from clinging to flaps. Embodiments of the present disclosure provide pressure relief devices that prevent, minimize, or otherwise reduce a possibility of water infiltrating therethrough into a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A pressure relief assembly comprising:
   a housing defining an air passage chamber having at least one opening;
   a flap secured within the air passage chamber, wherein the flap is anchored to the housing by a bracket, and wherein the flap is configured to move into an open position to expose the at least one opening to relieve air pressure;
   at least one liquid diverter extending from a top wall of the housing and downwardly canted away from the flap, wherein a channel is formed between the at least one liquid diverter and the bracket, and wherein the at least one liquid diverter is configured to direct moisture away from the flap and the channel; and
   an upstanding outer rim that is configured to divert moisture around the air passage chamber.

2. The pressure relief assembly of claim 1, wherein the air passage chamber is defined by lateral walls connected to the top wall, a bottom wall, and an air passage wall, and wherein the flap is secured over the air passage wall.

3. The pressure relief assembly of claim 2, wherein the at least one liquid diverter extends outwardly from the top wall above the flap.

4. The pressure relief assembly of claim 1, wherein the at least one liquid diverter is downwardly canted at a first angle with respect to an interior surface of the top wall of the pressure relief assembly, and wherein the flap in an at-rest position is oriented at a second angle with respect to the interior surface of the top wall, wherein the first angle is greater than the second angle.

5. The pressure relief assembly of claim 4, wherein the first angle is greater than 90 degrees and less than 180 degrees.

6. The pressure relief assembly of claim 1, wherein the at least one liquid diverter is integrally formed and molded with the housing.

7. The pressure relief assembly of claim 1, wherein the pressure relief assembly further comprises an additional liquid diverter extending from the bracket.

8. The pressure relief assembly of claim 7, wherein the at least one liquid diverter is positioned above and spaced apart from the additional liquid diverter.

9. The pressure relief assembly of claim 8, wherein the at least one liquid diverter is parallel with the additional liquid diverter.

10. The pressure relief assembly of claim 1, wherein the at least one liquid diverter includes an expanded main portion that connects to the housing through a recessed root.

11. A pressure relief assembly comprising:
    a housing including a plurality of air passage chambers, wherein each of the plurality of air passage chambers is defined by lateral walls connected to a top wall, a bottom wall, and an air passage wall, wherein the air passage wall includes at least one opening;
    a plurality of flaps secured within the air passage chambers over the air passage walls, wherein each of the plurality of flaps is anchored to the housing by a bracket, wherein each of the brackets extends through their respective flap of the plurality of flaps, and wherein each of the plurality of flaps is configured to move into an open position to expose the at least one opening to relieve air pressure;
    at least one liquid diverter outwardly and downwardly canted away from the plurality of flaps and from at least one of the top walls above the plurality of flaps, wherein each of the plurality of air passage chambers includes a channel that is formed between the top wall and the bracket, and wherein the at least one liquid diverter is configured to direct moisture away from the plurality of flaps; and
    an upstanding outer rim that is configured to divert moisture around the plurality of air passage chambers.

12. The pressure relief assembly of claim 11, wherein the at least one liquid diverter is downwardly canted at a first angle with respect to an interior surface of at least one of the top walls, and wherein the plurality of flaps in at-rest positions are oriented at a second angle with respect to the interior surface of at least one of the top walls, wherein the first angle is greater than the second angle.

13. The pressure relief assembly of claim 12, wherein the first angle is greater than 90 degrees and less than 180 degrees.

14. The pressure relief assembly of claim 11, wherein the at least one liquid diverter is integrally formed and molded with the housing.

15. The pressure relief assembly of claim 11, wherein the at least one liquid diverter comprises a first liquid diverter and a second liquid diverter, wherein the first liquid diverter is positioned above and spaced apart from the second liquid diverter, and wherein the first liquid diverter is parallel with the second liquid diverter.

16. The pressure relief assembly of claim 11, wherein the at least one liquid diverter includes an expanded main portion that connects to the housing through a recessed root.

17. A pressure relief assembly comprising:
    a housing defining an air passage chamber defined by lateral walls connected to a top wall, a bottom wall, and an air passage wall, wherein the air passage wall includes at least one opening;
    a flap secured within the air passage chamber, wherein the flap is configured to move into an open position to expose the at least one opening to relieve air pressure;
    at least one liquid diverter integrally formed and molded with the housing, wherein the at least one liquid diverter outwardly and downwardly cants away from the flap and from the top wall above the flap, wherein the at least one liquid diverter is configured to direct moisture away from the flap, wherein the at least one liquid diverter is downwardly canted at a first angle with respect to an interior surface of the top wall of the pressure relief assembly, and wherein the flap in an at-rest position is oriented at a second angle with respect to the interior surface of the top wall, wherein the first angle is greater than the second angle, wherein the first angle is greater than 90 degrees and less than 180 degrees; and
    an upstanding outer rim that is configured to divert moisture around the air passage chamber, wherein an interior channel is formed between the at least one liquid diverter and the upstanding outer rim.

* * * * *